358-69. OR 3,103,552 SR

SEARCH ROOM
T6532

Sept. 10, 1963 F. P. KEIPER, JR 3,103,552

ELIMINATION OF SIGNAL-INDUCED PHASE ERROR FROM INDEX SIGNAL

Filed July 14, 1960

INVENTOR.
FRANCIS P. KEIPER, JR.
BY
Fordyce A. Bothwell
ATTORNEY 3,103,552

ELIMINATION OF SIGNAL-INDUCED PHASE ERROR FROM INDEX SIGNAL

Francis P. Keiper, Jr., Oreland, Pa., assignor, by mesne assignments, to Philco Corporation, Philadelphia, Pa., a corporation of Delaware Filed July 14, 1960, Ser. No. 42,903
11 Claims. (Cl. 178—5.4)

Figure 1:
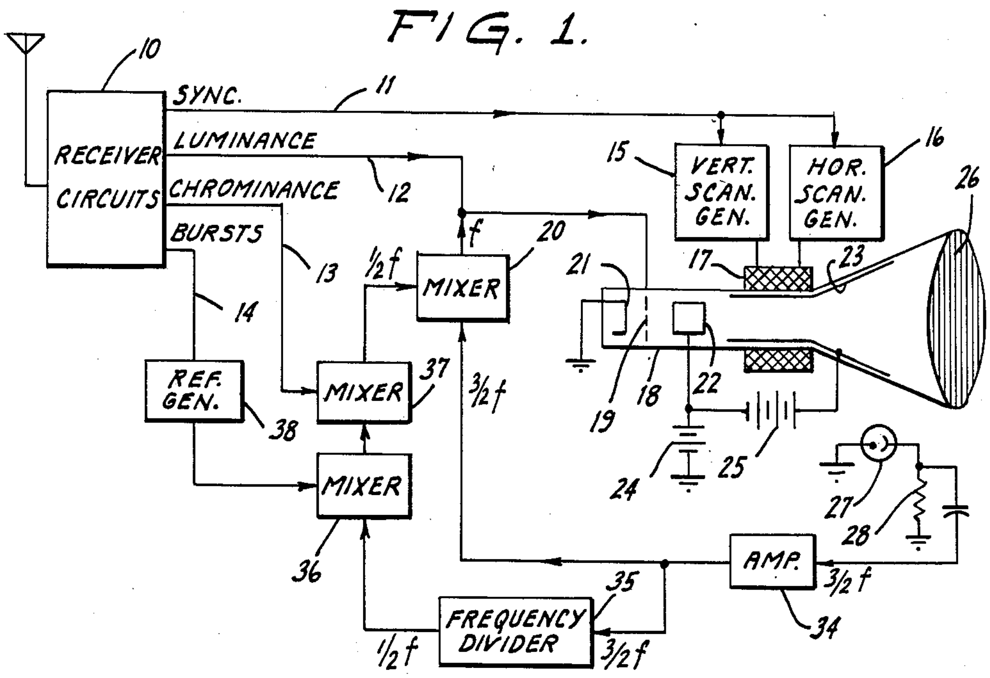

This invention relates to color television receivers and more particularly to receivers of the type employing a single index-type cathode ray tube which, in addition to producing the color image, produces an index signal indicative of the instantaneous position of the electron beam, such signal being utilized to effect proper coordination at each instant between modulation and position of said beam, which is essential for proper color rendition. Color television receivers of this type are now well known in the art, and therefore the following brief discussion thereof will suffice for the purpose of this specification.

First, with respect to the cathode ray tube, the screen thereof comprises successive sets of light-emissive elements, the elements of each set being emissive of light of different primary colors in response to electron impingement. The screen further comprises means for producing the desired index signal, e.g. by light emission or by secondary electron emission. Preferably, the colored light-emissive elements are in the form of stripes extending transversely to the direction of line scanning and arranged in triplets, each triplet comprising phosphor stripes emissive of light of three primary colors, such as red, green and blue. The means for producing the index signal preferably comprises stripes in parallel relation to the colored light-producing stripes and positionally related thereto so that the phase of the index signal is indicative of the position of the electron beam in relation to the triplets.

Next, with respect to the reproduction of the color image, it should be borne in mind that the now-standard composite color television signal comprises the luminance signal, the chrominance signal which is transmitted as amplitude and phase modulation of a subcarrier in the upper portion of the video band, and the color reference signal consisting of bursts of the unmodulated subcarrier occurring during the blanking intervals immediately following the horizontal synchronizing pulses. In a receiver of the type here involved, the color writing frequency, usually about 6 mc., is the nominal rate at which the electron beam traverses the color triplets, i.e. the number of triplets traversed per second. For proper reproduction of the color image, it is necessary to produce a color writing signal at the color writing frequency containing the color information of the chrominance signal and phased according to the indexing information of the index signal.

The production of the color writing signal involves processing of the various signals. For example, an index signal having the color writing frequency of 6 mc. may be heterodyned with the color reference signal having a frequency of 3.58 mc. to produce a resultant signal having a frequency of 9.58 mc. and phased according to the indexing information of the index signal. The 9.58 mc. signal may then be heterodyned with the 3.58 mc. chrominance signal to produce the 6 mc. color writing signal which contains the color information of the chrominance signal and is phased according to the indexing information of the index signal.

In any case, the processing to produce the color writing signal tends to introduce undesirable delay or phase lag into the color writing signal and thus tends to cause color error in the color image.

In a color television receiver of the type briefly described above, the index signal may be produced by providing an index stripe for each of the color triplets, in which case the index signal has a frequency corresponding to the rate of beam traversal of the triplets. Such an index signal is "unambiguous" in that its phase at any particular instant is necessarily indicative of beam position for a certain one color. However, with such an arrangement phase error is introduced into the index signal when the color component of the beam modulation is high, i.e. when the ratio of chrominance to luminance is high, due to highly saturated colors of the object or scene being televised. To overcome this objection an "ambiguous" index signal may be derived. Such a signal is phase invariant in the presence of strong beam modulating color signal, but it is ambiguous in that its phase at any particular instant is not necessarily indicative of beam position for a certain one color but may be indicative of beam position for any one of several colors. After derivation of such an ambiguous signal, it may be converted to an unambiguous signal by suitable frequency conversion means. For example, as disclosed and claimed in the co-pending application of F. P. Keiper et al., Serial No. 797,684, filed March 6, 1959, an ambiguous signal having a frequency bearing a fractional relation to the color writing frequency may be derived and may be converted to an unambiguous signal having the color writing frequency. However, in such a system, the frequency conversion of an ambiguous signal to an unambiguous signal tends to introduce additional undesirable delay or phase lag into the color writing signal.

The principal object of the present invention is to overcome the above-mentioned objections and to provide a color television receiver wherein a color writing signal is produced which is substantially free of phase error and which therefore is truly representative of the color content of the object or scene being televised.

In accordance with this invention, a dual channel arrangement is provided wherein the color processing is caused to take place in one channel and the phase error incident thereto is caused to counteract or cancel phase error of the signal in the other channel. Where the system also involves frequency conversion of an ambiguous signal, the frequency conversion is also caused to take place in the color processing channel, and the phase error incident thereto is caused to counteract or cancel phase error of the signal in the other channel.

Figure 2:
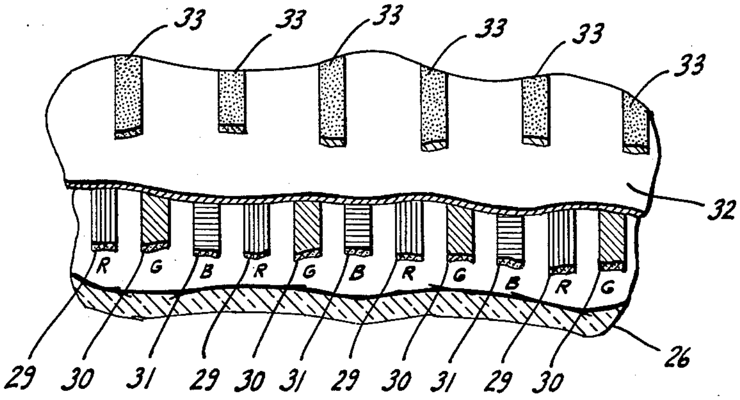

The invention may be fully understood from the following detailed description, with reference to the accompanying drawing wherein FIG. 1 is a block diagram of a color television receiver including an embodiment of this invention; and FIG. 2 is a fragmentary perspective view of a screen structure which may be employed in the image-producing cathode ray tube of FIG. 1.

Referring first to FIG. 1, block 10 represents the conventional receiver circuits by which the components of an incoming color television signal may be derived. These components comprise the deflection synchronizing components derived at output connection 11, the luminance component derived at output connection 12, the chrominance derived at output connection 13, and the color synchronizing bursts derived at output connection 14. The deflection synchronizing components are supplied over connection 11 to the conventional vertical and horizontal scanning circuits represented at 15 and 16 which supply deflection currents to the yoke 17, associated with the cathode ray tube 18. The luminance component is supplied to the control grid 19 of the cathode ray tube. The color writing signal having the color writing frequency *f*, which may be produced as hereinafter described, is derived from heterodyne mixer 20 and is also supplied to the control grid 19.

The cathode ray tube 18 comprises, in addition to the control grid 19, the usual cathode 21 and at least one anode. In the form shown, it comprises a focussing anode 22 and an accelerating anode 23 which may consist of a conductive coating on the inside wall of the tube. Suitable operating voltages may be supplied from the receiver's power supply, the batteries 24 and 25 being conveniently representative of the voltage sources.

The faceplate 26 may serve as a supporting base for the screen elements, as hereinafter described, it being understood that the cathode ray tube is of the index type. Preferably, the cathode ray tube is of the photo-index type, i.e. it produces the index signal by light emission from index elements of the screen. The index elements may be formed of fluorescent material, such as zinc oxide, which emits invisible light in response to electron impingement. The photo-cell 27 receives the light pulses and produces the index signal across resistor 28. Such production of the index signal is well known, as shown for example in U.S. Patent No. 2,749,449, issued June 5, 1956, to W. E. Bradley, et al. Of course, it will be understood that the index signal may be produced in any other suitable manner, e.g. by secondary electron emission as also well known in the art.

In the system of FIG. 1 an ambiguous signal having the frequency $3/2f$ is derived from the screen structure of the cathode ray tube. A suitable screen structure for this purpose is shown in FIG. 2 to which reference is now made. In this structure, the colored light-emissive stripes are placed on the faceplate 26, preferably by the well known photo-deposition method. These stripes may comprise red light-emissive stripes 29, green light-emissive stripes 30, and blue light-emissive stripes 31. Thus there are successive triplets, each of whose stripes is capable of emitting light of a different primary color. A thin film or layer 32 of electron-permeable light-reflecting material, such as aluminum, is placed over said stripes so as to reflect light emitted from the rear thereof. The index stripes 33 are placed on said film, preferably by the photo-deposition method. To produce the $3/2f$ index signal, the index stripes may be placed behind alternate spaces between the colored light-emissive stripes, as shown.

Referring again to FIG. 1, in accordance with this invention a dual channel arrangement is provided as now to be described. The $3/2f$ index signal produced across resistor 28 is amplified in amplifier 34 and the amplified signal is supplied directly to the heterodyne mixer 20. The amplified $3/2f$ index signal is also supplied to frequency conversion means 35 which, in this instance, is a three-to-one frequency divider that converts the $3/2f$ signal to a $1/2f$ signal. The latter signal is supplied to the color processing circuits which may comprise heterodyne mixers 36 and 37. The bursts are supplied to a reference regenerator 38 which supplies to the mixer 36 a continuous color reference signal having the frequency and phase of the bursts, e.g. 3.58 mc. The $1/2f$ signal (3 mc.) is also supplied to mixer 36 which, through additive heterodyne action, produces a resultant signal having a frequency of 6.58 mc. and phased according to the indexing information of the frequency-converted index signal. The resultant signal is supplied to mixer 37 which also receives the 3.58 mc. chrominance signal. By subtractive heterodyne action the mixer 37 produces a $1/2f$ (3 mc.) signal which contains the color information of the chrominance signal and is phased according to the indexing information of the frequency-converted index signal. The $1/2f$ color signal is supplied to mixer 20 which, through subtractive heterodyne action, produces the color writing signal having the color writing frequency $f$.

While in the illustrated system as above described the color writing signal is produced by heterodyne action, it will be understood that said signal may be produced in other ways. For example, it may be produced by the well known demodulation-remodulation process.

It is important, of course, in any case, that the color writing signal be properly phased in order that it shall be truly representative of the color content of the object or scene being televised. The arrangement according to this invention effects cancellation of phase shifts which are inherent in the system components. In this system there is a direct channel between the amplifier 34 and the mixer 20 through which the $3/2f$ index signal is supplied to mixer 20, and there is also a parallel channel in which frequency conversion and color signal processing are effected. The phase shifts incident to the frequency conversion and the color signal processing are caused to cancel the time delay or phase lag to which the $3/2f$ signal is subjected in passing through the amplifier 34 and mixer 20. Since the mixer 20 produces the color writing signal by subtractive heterodyne action, the phase deviations in the signals supplied to it are subjected to subtractive cancelling action so that the color writing signal $f$ is substantially free of objectionable phase error.

While a single embodiment of the invention has been illustrated and described, it will be understood that the invention is not limited thereto but contemplates such modifications and other embodiments as may occur to those skilled in the art.

I claim:

1. In a color television receiver employing a color image-producing cathode ray tube of the index type, wherein an index signal is derived and it is necessary to produce a color writing signal containing the chrominance information of a received signal and phased according to the indexing information of the index signal, a pair of channels in mutually parallel relation to which the derived index signal is supplied, means in one of said channels for producing a signal containing the chrominance information of a received signal and phased according to the indexing information of the indexing signal, means for effecting mutual cancellation of the phase deviations of the signal outputs of said channels and for producing a color writing signal which is substantially free of objectionable phase error, and means for supplying said color writing signal to said cathode ray tube.

2. In a color television receiver adapted to receive a color television signal from which are derived a chrominance component and a color reference component, a color image-producing cathode ray tube of the index type, means for deriving an index signal from said tube, a pair of channels in mutually parallel relation to which the derived index signal is supplied, means in one of said channels to which said chrominance component and said color reference component are supplied for producing a signal containing the chrominance information of said chrominance component and phased according to the indexing information of the indexing signal, means for effecting mutual cancellation of the phase deviations of the signal outputs of said channels and for producing a color writing signal which is substantially free of objectionable phase error, and means for supplying said color writing signal to said cathode ray tube.

3. In a color television receiver employing a color image-producing cathode ray tube of the index type wherein the color image is produced by electron beam impingement of screen elements which are successively and repetitively emissive of light of different colors according to chrominance modulation of said beam, means for deriving an ambiguous index signal which is not subject to misphasing by high chrominance modulation of said beam but which is not necessarily indicative of the instantaneous position of said beam in relation to said screen elements, a pair of channels in mutually parallel relation to which the derived index signal is supplied, means in one of said channels for effecting frequency conversion of the index signal supplied thereto, other means in said one channel for producing a signal containing the chrominance information of a received signal and phased according to the indexing information of the frequency-converted index signal, means for producing from the outputs of said channels a color writing signal which is substantially free of objectionable phase error, and means for supplying said color writing signal to said tube to modulate said beam.

4. In a color television receiver adapted to receive a color television signal from which are derived a chrominance component and a color reference component, a color image-producing cathode ray tube of the index type wherein the color image is produced by electron beam impingement of screen elements which are successively and repetitively emissive of light of different colors according to chrominance modulation of said beam, means for deriving an ambiguous index signal which is not subject to misphasing by high chrominance modulation of said beam but which is not necessarily indicative of the instantaneous position of said beam in relation to said screen elements, a pair of channels in mutually parallel relation to which the derived index signal is supplied, means in one of said channels for effecting frequency conversion of the index signal supplied thereto, other means in said one channel to which said chrominance and color reference components are supplied for producing a signal containing the chrominance information of said chrominance component and phased according to the indexing information of the frequency-converted index signal, means for producing from the outputs of said channels a color writing signal which is substantially free of objectionable phase error, and means for supplying said color writing signal to said tube to modulate said beam.

5. In a color television receiver adapted to receive a color television signal from which are derived a chrominance component and a color reference component, a color image-producing cathode ray tube of the index type wherein the color image is produced by electron beam impingement of screen elements which are successively and repetitively emissive of light of different colors according to chrominance modulation of said beam, means for deriving an ambiguous index signal which is not subject to misphasing by high chrominance modulation of said beam but which is not necessarily indicative of the instantaneous position of said beam in relation to said screen elements, a pair of channels in mutually parallel relation to which the derived index signal is supplied, means in one of said channels for effecting frequency conversion of the index signal supplied thereto, a pair of heterodyne mixers in said one channel to which said chrominance and color reference components are supplied for producing a signal containing the chrominance information of said chrominance component and phased according to the indexing information of the frequency-converted index signal, means for producing from the outputs of said channels a color writing signal which is substantially free of objectionable phase error, and means for supplying said color writing signal to said tube to modulate said beam.

6. In a color television receiver, a color image-producing cathode ray tube having an image screen to be scanned line-by-line by an electron beam within the tube, means for effecting the scanning motion of the electron beam, said screen comprising successive sets of colored-light-emissive elements which are successively impinged by the electron beam during each line scan, the elements of each set successively emitting light of different primary colors, means for producing in response to the scanning of said screen an index signal having a frequency which bears a fractional relation to the rate of scanning of said sets, a pair of channels in mutually parallel relation to which said index signal is supplied, means in one of said channels for effecting frequency conversion of the index signal supplied thereto, other means in said one channel for producing a signal containing the chrominance information of a received signal and phased according to the indexing information of the frequency-converted index signal, means for producing from the outputs of said channels a color writing signal which is substantially free of objectionable phase error, and means for supplying said color writing signal to said tube to modulate said electron beam.

7. In a color television receiver adapted to receive a color television signal from which are derived a chrominance component and a color reference component, a color image-producing cathode ray tube having an image screen to be scanned line-by-line by an electron beam within the tube, means for effecting the scanning motion of the electron beam, said screen comprising successive sets of colored light-emissive elements which are successively impinged by the electron beam during each line scan, the elements of each set successively emitting light of different primary colors, means for producing in response to the scanning of said screen an index signal having a frequency which bears a fractional relation to the rate of scanning of said sets, a pair of channels in mutually parallel relation to which said index signal is supplied, means in one of said channels for effecting frequency conversion of the index signal supplied thereto, other means in said one channel to which said chrominance and color reference components are supplied for producing a signal containing the chrominance information of said chrominance component and phased according to the indexing information of the frequency-converted index signal, means for producing from the outputs of said channels a color writing signal which is substantially free of objectionable phase error, and means for supplying said color writing signal to said tube to modulate said electron beam.

8. In a color television receiver adapted to receive a color television signal from which are derived a chrominance component and a color reference component, a color image-producing cathode ray tube having an image screen to be scanned line-by-line by an electron beam within the tube, means for effecting the scanning motion of the electron beam, said screen comprising successive sets of colored light-emissive elements which are successively impinged by the electron beam during each line scan, the elements of each set successively emitting light of different primary colors, means for producing in response to the scanning of said screen an index signal having a frequency which bears a fractional relation to the rate of scanning of said sets, a pair of channels in mutually parallel relation to which said index signal is supplied, means in one of said channels for effecting frequency conversion of the index signal supplied thereto, a pair of heterodyne mixers in said one channel to which said chrominance and color reference components are supplied for producing a signal containing the chrominance information of said chrominance component and phased according to the indexing information of the frequency-converted index signal, means for producing from the outputs of said channels a color writing signal which is substantially free of objectionable phase error, and means for supplying said color writing signal to said tube to modulate said electron beam.

9. In a color television receiver, a color image-producing cathode ray tube having an image screen to be scanned line-by-line by an electron beam within the tube, means for effecting the scanning motion of the electron beam, said screen comprising successive sets of colored light-emissive elements which are successively impinged by the electron beam during each line scan, the elements of each set successively emitting light of different primary colors, means for producing in response to the scanning of said screen an index signal having the frequency $3/2f$ where $f$ is the rate of scanning of said sets, a pair of channels in mutually parallel relation to which said index signal is supplied, means in one of said channels for converting said index signal to a signal having the frequency $1/2f$, other means in said one channel for producing from the latter signal a signal having the same frequency and containing the chrominance information of a received signal and phased according to the indexing information of the frequency-converted index signal, means for producing from the outputs of said channels a color writing signal having the frequency $f$ substantially free of objectionable phase error, and means for supplying said color writing signal to said tube to modulate said electron beam.

10. In a color television receiver adapted to receive a color television signal from which are derived a chrominance component and a color reference component, a color image-producing cathode ray tube having an image screen to be scanned line-by-line by an electron beam within the tube, means for effecting the scanning motion of the electron beam, said screen comprising successive sets of colored light-emissive elements which are successively impinged by the electron beam during each line scan, the elements of each set successively emitting light of different primary colors, means for producing in response to the scanning of said screen an index signal having the frequency $3/2f$ where $f$ is the rate of scanning of said sets, a pair of channels in mutually parallel relation to which said index signal is supplied, means in one of said channels for converting said index signal to a signal having the frequency $1/2f$, other means in said one channel to which said chrominance and color reference components are supplied for producing from the latter signal a signal having the same frequency and containing the chrominance information of said chrominance component and phased according to the indexing information of the frequency-converted index signal, means for producing from the outputs of said channels a color writing signal having the frequency $f$ substantially free of objectional phase error, and means for supplying said color writing signal to said tube to modulate said electron beam.

11. In a color television receiver adapted to receive a color television signal from which are derived a chrominance component and a color reference component, a color image-producing cathode ray tube having an image screen to be scanned line-by-line by an electron beam within the tube, means for effecting the scanning motion of the electron beam, said screen comprising successive sets of colored light-emissive elements which are successively impinged by the electron beam during each line scan, the elements of each set successively emitting light of different primary colors, means for producing in response to the scanning of said screen an index signal having the frequency $3/2f$ where $f$ is the rate of scanning of said sets, a pair of channels in mutually parallel relation to which said index signal is supplied, means in one of said channels for converting said index signal to a signal having the frequency $1/2f$, a pair of heterodyne mixers in said one channel to which said chrominance and color reference components are supplied for producing from the latter signal a signal having the same frequency and containing the chrominance information of said chrominance component and phased according to the indexing information of the frequency-converted index signal, a heterodyne mixer for producing from the outputs of said channels a color writing signal having the frequency $f$ substantially free of objectionable phase error, and means for supplying said color writing signal to said tube to modulate said electron beam.

References Cited in the file of this patent

FOREIGN PATENTS 590,059 Canada ---------------- Jan. 5, 1960